United States Patent [19]

Weber et al.

[11] 3,950,675
[45] Apr. 13, 1976

[54] MOTOR PROTECTION DEVICE

[75] Inventors: Clement J. Weber, Evansville; Henno Normet, Indianapolis, both of Ind.

[73] Assignee: Diversified Electronics, Inc., Evansville, Ind.

[22] Filed: July 12, 1974

[21] Appl. No.: 488,162

[52] U.S. Cl. ............ 317/13 A; 317/31; 317/36 TD; 317/141 S
[51] Int. Cl.² .......................................... H02H 3/28
[58] Field of Search .... 317/36 TD, 22, 141 S, 13 R, 317/13 A, 33 SC, 31

[56] References Cited
UNITED STATES PATENTS

| | | | |
|---|---|---|---|
| 3,774,082 | 11/1973 | Chang | 317/13 A |
| 3,784,846 | 1/1974 | Krick et al. | 317/141 S |
| 3,814,991 | 6/1974 | Hewitt | 317/13 A |

Primary Examiner—Gerald Goldberg
Assistant Examiner—Harry Moose
Attorney, Agent, or Firm—Baker & McKenzie

[57] ABSTRACT

Electrical and electronic circuitry offering protection to motors, compressors and the like, from conditions of low energizing voltage or momentary voltage interruptions resulting in excessive mechanical load (locked rotor). When the undesirable condition is present, an internal relay prevents the equipment from being energized - transient conditions being allowed for by means of suitable time delay circuitry. The protection device provides significant improvement in safety and economy by preventing equipment from burning up.

4 Claims, 1 Drawing Figure

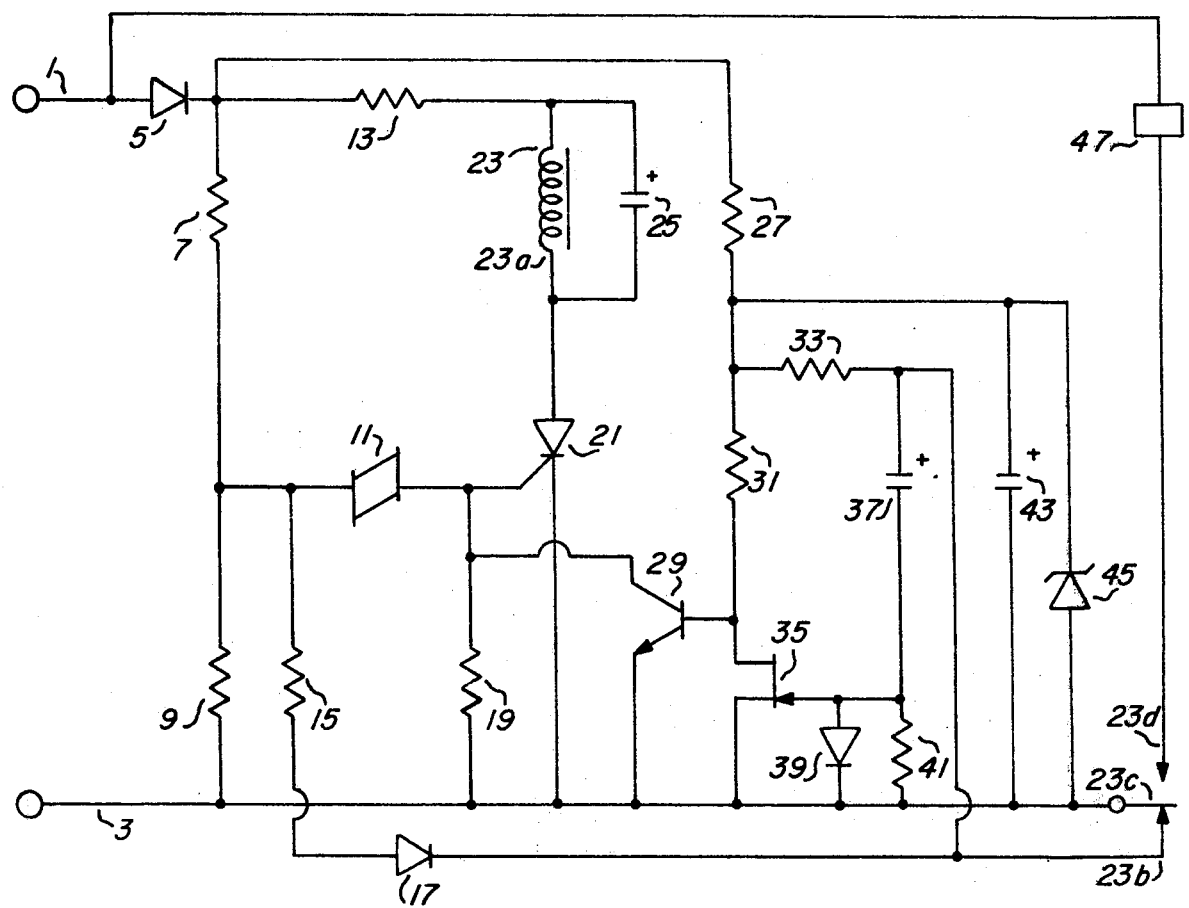

MOTOR PROTECTION DEVICE

A common problem in many motor applications is the advent of reduced line voltage. Although the motor may continue to run, it must draw objectionably high current — resulting in burnout or accelerated failure. Another problem area, arising from a momentary power interruption, resulting in a similar type of failure, is high current caused by a locked rotor. While these difficulties have plagued industry for many years, the advent of energy shortages has exacerbated the problem to a point where it is no longer economical to ignore the expenses caused by these failures.

A particular type of failure associated with air conditioning and refrigeration equipment occurs when a compressor is allowed to build up to peak pressure, and power is subsequently removed and reapplied. This places excessive strain on the compressor, at the same time that a nearly locked rotor condition occurs at the motor. Failures of both the motor and compressor frequently occur.

Methods for dealing with these problems in the past, primarily thermal devices, were known to be imperfect — but the less frequent occurence of power difficulties made it possible to live with the situation. In a climate of limited available energy, the use of slow acting thermal devices simply allows an intolerable number of failures. Furthermore, in the case of thermal sensing, an insidious deterioration of insulation can occur over a period of time. The invention described herein provides rapid response to the undesirable conditions, and thereby affords effective protection of equipment. An additional feature of the invention is the incorporation of means for delaying reapplication of power until safe conditions obtain — a vital consideration in protection of air conditioning and refrigeration equipment.

The present invention becomes apparent from the following description, taken in conjunction with the accompanying drawing of the circuit.

When the voltage at line 1 is sufficiently positive with respect to line 3, and the consequent voltage at the junction of resistor 7 and resistor 9 exceeds the breakdown voltage of breakdown device 11, a trigger pulse is applied to the gate of semiconductor switch 21. A relay coil 23a, shunted by a capacitor 25, is energized by the triggering of semiconductor switch 21, and output contacts 23b, c, d of relay 23 are thereby transferred. Resistor 15 is consequently removed from being shunted across resistor 9, so that a lower voltage will be required between lines 1 and 3 to cause the potential at the junction of resistors 7 and 9 to exceed the breakdown voltage of breakdown device 11. This provides desired hysteresis or differential between pickup and dropout voltage. It should be understood that practical operation of the device occurs in situations involving the periodic reduction of voltage between lines 1 and 3, so that current in the semiconductor switch is periodically reduced below its holding current — but that the time constant of relay coil 23a and capacitor 25 is long compared with such period, thereby retaining energization of the relay from cycle to cycle. The capacitor shunting the relay coil also serves to provide a suitable delay when line voltage is reduced for momentary periods, thereby providing desirable protection from nuisance tripping.

Upon transfer of contacts 23b, c, d, capacitor 37 charges through line 1, resistor 27, resistor 33, diode 39 line 3. If it is desired that the voltage to which the capacitor charges be regulated to an established DC value for enhancement of precision, a Zener diode 45 may be incorporated as a regulator and capacitor 43 as a filter. When the voltage at line 1 decreases for a sustained number of cycles — sufficient to cause relay 23 to deop out — the charged capacitor 37 discharges through the normally closed contacts 23b, c, and timing resistor 41. This places a negative bias on the gate of the FET 35. When the gate of the FET 35 is driven negative, current previously drawn through resistor 31 and FET 35 is now drawn through resistor 31 and the base-to-emitter of transistor 29. This renders the collector-to-emitter of transistor 29 conductive, dropping the potential across the gate resistor 19, and thereby keeping the semiconductor switch 21 from being triggered into conduction. While capacitor 37 is thus discharging, therefore, relay 23 is inhibited from reoperating. This provides the desired delay on reoperation vital to the protection of such devices as compressors. Diode 17 serves to decouple the timing circuit and voltage sensing circuit. by preventing the timing capacitor from discharging through resistor 15.

When capacitor 37 has partially discharged through resistor 41 and relay contacts 23b, c, and attained a level above the gate pinch-off voltage of FET 35, FET 35 is driven into conduction and transistor 29 is taken out of conduction. This allows a current pulse through breakdown device 11 to reach gate of semiconductor switch 21 instead of being shunted through transistor 29.

When the above transition occurs, movable relay contact 23c transfers from N.C. contact 23b to N.O. contact 23d and applies power to load 47 by completing the circuit from line 1 through load 47 and back to line 3.

While the above description is applicable to a voltage which is unidirectional, but periodically reduces to a value which falls below the level required to maintain conduction of the semiconductor switch, it is possible to apply the basic circuit to a conventional alternating current. This is accomplished by introduction of a diode 5 in series with line 1. A resistor 13 may be required in practical cases to limit the peak current carried by semiconductor switch 21 when energized through discharged capacitor 25.

We claim:

1. Apparatus for use in combination with an electrical load and an electrical power supply having a pair of output terminals, comprising:

normally open switch means connecting said load to said power source to the closed position, and disconnecting said load from said source in the open position;

first and second input terminals connectable to said pair of output terminals;

a first impedance element connected between said first input terminal and a circuit node;

a second impedance element connected between said second input terminal and said node;

a relay coil for closing said switch means when energized, being connected between said first and second input terminals and in series with a gated semiconductor switching device having a gate terminal;

a voltage sensitive break-down device connected between said node and said gate terminal for applying a gate control signal to said gate terminal when the voltage level at said node exceeds a predetermined value;

said semi-conductor switching device being responsive to said gate control signal to energize said relay coil only in the presence of said signal;

an inhibit circuit connected to said gate terminal for preventing said semi-conductor switching device from responding to said signal for a predetermined period of time after said switch means is changed from the open to the closed position;

a third impedance element connected between said node and said second input terminal; and switch means connected in series with said third impedance element and responsive to energization of said coil to open the current path through said third impedance element.

2. Apparatus for use in combination with and connectable to an electric motor requiring a specified minimum voltage level for proper operation, and an electrical power supply for selectively interconnecting said motor and said power supply, comprising:

a voltage level detector circuit connected to said power supply and responsive to the voltage level occurring at output terminals of said power supply to generate a control signal only when said voltage level at said output terminals is greater than or equal to said specified minimum voltage level;

relay means having a relay coil and a set of normally-open contacts for interconnecting said motor and said power supply when said relay coil is energized;

switch means connected to said coil and responsive to said detector circuit control signal for energizing said coil;

said switch means being operative to prevent the flow of current through said coil in the absence of said control signal, whereby said first set of contacts are opened and said motor is disconnected from said power supply in the absense of said control signal;

an inhibit circuit for preventing said switch means from responding to said control signal for a predetermined period of time after opening of said contacts.

3. Apparatus in accordance with claim 2 wherein said relay further comprises a set of normally-closed contacts and wherein said voltage level detector circuit comprises a first impedance element connected in series with a second and third impedance elements connected in parallel, said third impedance element being connected in series with said normally-closed contacts, whereby the current path through said third impedance element is opened when said coil is energized.

4. Apparatus in accordance with claim 2, wherein said relay further comprises a set of normally-closed contacts and wherein said inhibit circuit comprises a capacitor having a discharge path including said normally-closed contacts, and a gate circuit connected to said capacitor and said switch means and responsive to charge on said capacitor when said normally-closed contact is in the closed position to inhibit activation of said switch means.

* * * * *